May 13, 1924.
R. L. WILCOX
HOPPER BLADE
Filed Jan. 27, 1921
1,493,661
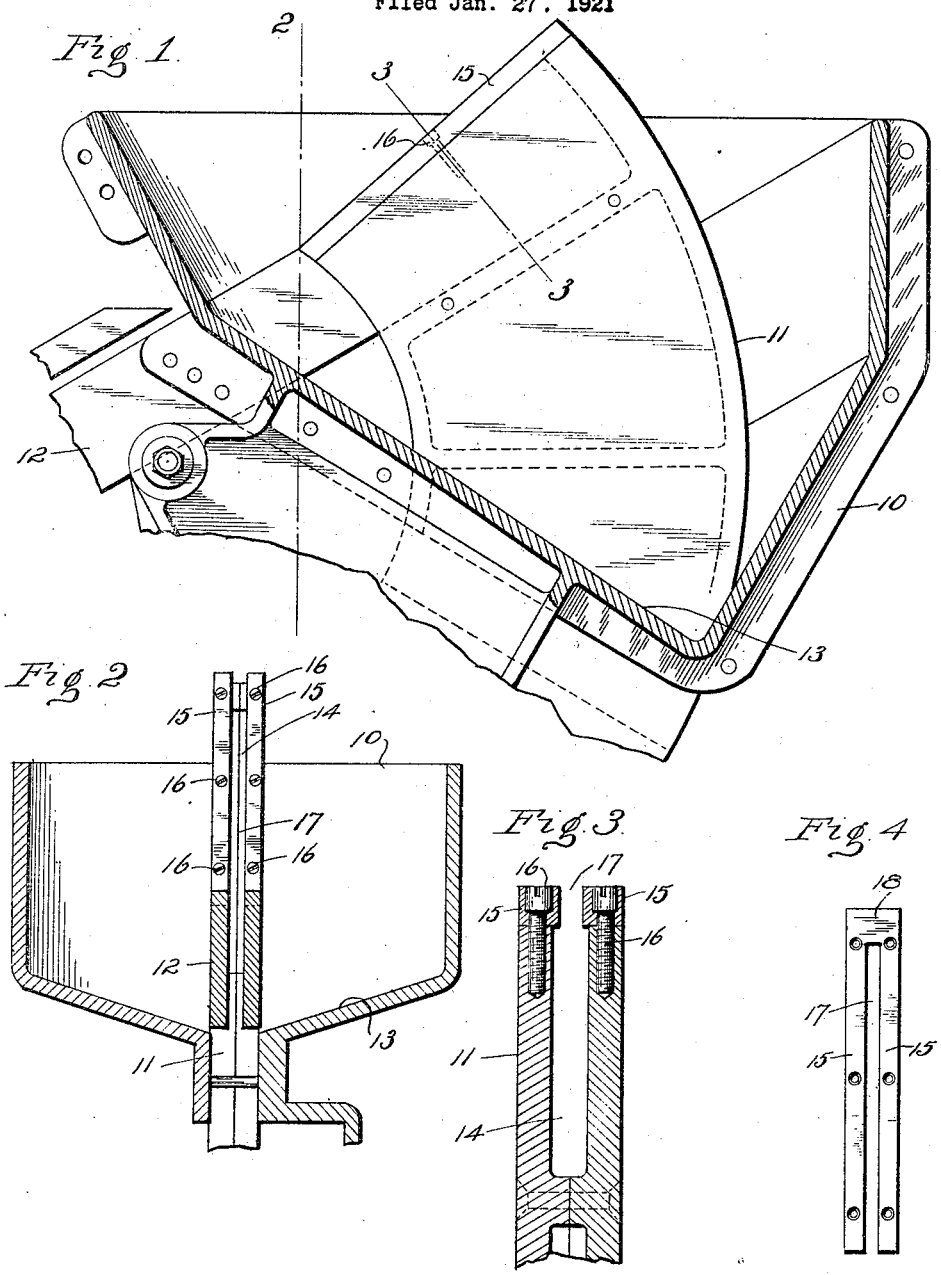

Patented May 13, 1924.

1,493,661

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

HOPPER BLADE.

Application filed January 27, 1921. Serial No. 440,540.

*To all whom it may concern:*

Be it known that I, RICHARD LESTER WILCOX, a citizen of the United States, residing at Waterbury, in the county of New Haven and State of Connecticut, have invented certain new and useful Improvements in Hopper Blades, of which the following is a specification, reference being had therein to the accompanying drawings.

This invention relates to hopper blades and has for its object, among other things, to provide the blade of a hopper with means whereby the same may be used for blanks of various sizes and to accomplish this desirable result with means that are simple in structure, economical to produce and easily and quickly applied.

Among other similar aims and objects of this invention may be recited, the elimination of the objectionable structures heretofore common in a device of this character whereby the blade becomes unnecessarily worn, and the surfaces engaged by the articles within the hopper either injured, ruined, or destroyed as well as the blade, the associated parts, or both, and even the articles themselves.

The improvements in the details and arrangements of parts of my improved hopper blade will be apparent from an inspection of the accompanying drawings, in connection with the description hereinafter contained, wherein a preferred embodiment of the invention is disclosed for the purpose of imparting a full understanding of the same.

In the drawings, Figure 1 is a fragmentary side elevation of one form of hopper with which my improved mechanism is adapted to be associated;

Figure 2 is a sectional view thereof taken generally upon line 2—2 of Figure 1;

Figure 3 is a transverse, fragmentary, sectional view of the upper portion of my improved hopper blade taken generally upon line 3—3 of Figure 1; and Figure 4 is a plan view of one of the forms in which the slotted plate may be made.

Having more particular reference to the drawings and in connection with which like reference characters will refer to corresponding parts in the several views, the numeral 10 designates the hopper into which articles are cast or thrown indiscriminately and are picked up therefrom by a hopper blade 11 which moves in a generally vertical path and from which the articles slide onto a delivery chute 12 and thence conveyed in a well known manner to a station for operation.

Hoppers and hopper blades are well known in the art as well as their method of operation and co-operative relation with each other and require no detailed description herein, except to state generally that the blade in its movement, referring now particularly to Figure 2, moves in a path through the hopper and when in one of its positions, the top of the blade is substantially in line and flush with the bottom 13 of the hopper, forming substantially at this point a part of said bottom. As the blade moves through the mass of articles lying loosely within the hopper, such of said articles as are in the path of the blade and are in the proper relative positions are picked up by the blade and carried to a point where they will slide therefrom either by gravity or by operated means, if desired, onto the chute 12.

The articles as they assemble on the hopper blade become adjusted so that a portion of each projects into a slot 14, the width of which is substantially the same as the width or diameter of the article at this point. This relative width of the slot 14 is desirable to insure perfect operation. Therefore, if the size of the articles placed in the hopper vary from one mass thereof to another, it is necessary that the width of the slot should be varied accordingly. This result is generally accomplished in either one or two ways. First by substituting an entirely new blade with the slot 14 of the proper width or second by making the blade in two separable sections, the upper section having a slot therein of the desired width. An illustration of this latter form of device is shown in the patent to R. L. Wilcox, No. 1,001,791, dated August 29, 1911. For some classes of work, either one or both of the devices just referred to are adapted, but for other classes both are objectionable. The first of the above methods is more seriously objectionable because it requires that a large number of blades be kept in stock to accommodate articles of various sizes and each must be accurately machined and fitted, and one blade is replaced by another only with skilled labor, exercising considerable care and ability. While with the second method the slotted sections are liable to become loosened, the joints worn by reason of the contact of the articles against the side thereof resulting in unusual wear at this point, and the articles are liable to enter these joints and either break the blade or injure or ruin the article. Aside from this, the sections are required to be fitted with care, all of the joints accurately machined and a large number of slotted sections kept in stock. With my improved hopper blade, all of these objections are overcome.

The numeral 15 designates two companion plates which are secured to the upper edge of the blade 11 by screws 16 or other similar means and are preferably although not necessarily hardened to minimize the wear thereon. These plates are made of various widths and each is assembled with the blade so that its outer edge is in the same plane as the sides of the blade 11, thus leaving an open space 17 therebetween of a predetermined width. Only one hopper blade is thus required in my invention and the plates 15 are assembled with and removed from the blade with little or no skill and the minimum expenditure of time. Thus the open space 17 between the plates 15 may be varied indefinitely, there are no joints that require exact machining or fitting, no screws or slots in such position as to be objectionable with respect to the articles within the hopper, and with the plates hardened, neither the articles, metal chips of other foreign matter that may come in contact therewith will cut or wear the edges of the plates.

For convenience, if desired, two of the plates 15 may be made of a single piece of metal, as shown in Figure 4, being joined at one end by an integral tie bar 18. When thus formed, the plates are assembled on the blade with the tie bar 18 adjacent to that edge of the blade farthest away from the chute 12.

Within the scope of the appended claims, all of which relate to a moving blade that during its operation passes up and down through a mass of articles, the details of my invention may be varied, from those herein shown.

What I claim is new and desire to secure by Letters Patent, is:

1. The combination with a slotted hopper blade, of non-adjustable but separable means attached to the top thereof adjacent to the open end of said slot and so arranged relatively, as to leave an open space that forms an extension of the slot within the blade.

2. The combination with a hopper blade having a slot therein, of a plate secured to the top edge thereof adjacent to the open end of the slot, and having a slot therein, and means for securing said plate to said blade, the relative position of said plate upon said blade being such that the slot therein forms an extension of the slot in said blade.

3. The combination with a slotted hopper blade having a slot therein; of relatively thin plate means attached to the upper edge thereof adjacent to the open end of said slot with the outer edges thereof substantially flush with the outer faces of the blade and so arranged as to leave an open space that forms an extension of the slot in the blade: and means that engage said upper edge for holding said plates in place.

4. A hopper blade for lifting blanks having a slot in its upper edge, the combination therewith of means for accommodating the same for blanks of various sizes, comprising relatively thin plate means arranged so as to leave an open space therethrough that forms an extension of the slot in the blade, the width of the open space in the plate means being relative to the size of the blank; and means for securing the plate to the top edge of the blade with the outer edges thereof substantially flush with the outside faces of the blade.

5. A hopper blade for lifting blanks having a slot in its upper edge, the combination therewith of means for accommodating the same for blanks of various sizes, comprising relatively thin plate means having a slot therein, the width of which is determined by the size of the blank; and means upon opposite sides of the slot for securing the plate means to the top edge of the blade against movement and adjustment.

In testimony whereof, I have hereunto affixed my signature.

RICHARD LESTER WILCOX.